United States Patent [19]

Blizzard

[11] 4,309,520

[45] Jan. 5, 1982

[54] SILICONE ADHESIVE FORMULATIONS

[75] Inventor: John D. Blizzard, Bay City, Mich.

[73] Assignee: Dow Corning Corporation, Midland, Mich.

[21] Appl. No.: 222,473

[22] Filed: Jan. 5, 1981

Related U.S. Application Data

[63] Continuation-in-part of Ser. No. 115,980, Jan. 28, 1980, abandoned.

[51] Int. Cl.$^3$ ............................................. C08F 283/00
[52] U.S. Cl. ...................................... 525/477; 427/387;
427/388.2; 427/393.5; 428/447; 428/450;
428/451; 525/1
[58] Field of Search ..................................... 525/1, 477

[56] References Cited

U.S. PATENT DOCUMENTS

| | | | |
|---|---|---|---|
| 3,929,704 | 12/1975 | Horning | 525/477 |
| 3,965,135 | 6/1976 | Knollmueller | 556/451 |
| 3,965,136 | 6/1976 | Knollmueller | 556/451 |
| 3,992,429 | 11/1976 | Knollmueller | 556/451 |
| 4,058,546 | 11/1976 | Knollmueller | 556/451 |
| 4,077,993 | 3/1978 | Knollmueller | 556/451 |

*Primary Examiner*—Melvyn I. Marquis
*Attorney, Agent, or Firm*—George A. Grindahl

[57] ABSTRACT

Physical properties, especially tack characteristics, of silicone adhesives comprising a silicone polymer and a silicone resin are improved by incorporation, prior to curing, of certain silicone cluster compounds. One preferred cluster compound has the formula $RSi\{OSi(OR')_3\}_3$ wherein R is a methyl group and R' is a secondary butyl group.

9 Claims, No Drawings

SILICONE ADHESIVE FORMULATIONS

BACKGROUND OF THE INVENTION

This application is a continuation-in-part of Application Ser. No. 115,980, filed Jan. 28, 1980 and now abandoned.

The present invention relates generally to silicone adhesives and more particularly to improvements in physical properties, especially tack characteristics, of pressure sensitive silicone adhesives.

Silicone pressure sensitive adhesives are generally provided in commerce in a form comprising an admixture of a silicone polymer, a silicone resin, a suitable solvent and, optionally, additives such as viscosity stabilizers. Curing of such mixtures is accomplished by thermal and/or catalytic means. Among the more common silicone polymers employed are hydroxyl-endblocked siloxane gums containing dimethylsiloxane, diphenylsiloxane, methylvinylsiloxane and/or phenylmethylsiloxane units. By way of example, these gums can be formed by the reaction of dimethylsiloxane cyclic compounds with relatively low viscosity hydroxyl-endblocked polydimethylsiloxanes in the presence of a suitable catalyst such as potassium silanolate. Resins typically employed in silicone pressure sensitive adhesive formulations include trimethylsiloxy-endblocked silicates providing about 2 percent silanol groups and having a ratio of trimethylsiloxy groups to $SiO_2$ groups of from about 0.4 to 1 to about 1.2 to 1 and preferably about 0.6 to 1. Solvents suitable for use in silicone pressure sensitive adhesives include aromatic solvents generally and preferably xylene. Additives for viscosity stabilization include isopropanol.

Formulations as described above provide a two phase system including a continuous, non-polar phase of polymer containing dissolved resin and a disperse, polar phase of resin containing dissolved polymer. The character of the continuous phase is generally acknowledged to provide for the cohesive properties of the adhesive while the disperse phase characteristics provide for the tack properties of the adhesive.

Adhesive formulations are selected to provide ratios of polymer to resin such as will generate acceptable balances between desired characteristics of adhesive strength and tack in the end product. Put another way, adhesive strength of the blends of polymer and resin forming a silicone pressure sensitive adhesive may be increased by increasing the resin content, but at the loss of tack properties.

By way of example, silicone pressure sensitive adhesive formulations generally are based upon a total combined weight of resin and polymer equalling 100 parts in a suitable solvent carrier, plus any of the conventional additives. In adhesive formulations projected for an end use wherein high tack characteristics are required, a relatively low weight ratio of resin to polymer is employed; on the order of 45 parts resin to 55 parts polymer. Formulations projected for end uses wherein exceptionally high adhesion characteristics are required will incorporate a relatively high ratio of resin to polymer; on the order of 75 parts resin to 25 parts polymer. The latter formulations are acknowledged to have rather poor tack characteristics when cured.

There exists in the art, therefore, a need for silicone pressure sensitive adhesive formulations that provide both the superior tack properties ordinarily associated only with those formulations having relatively low resin to polymer ratios as well as the strong adhesive characteristics ordinarily associated with formulations having relatively high resin to polymer ratios.

SUMMARY OF THE INVENTION

According to the present invention tack characteristics of a cured silicone pressure sensitive adhesive are enhanced by incorporating into adhesive formulations, prior to curing, a silicone cluster compound. This invention specifically relates to an improvement in a silicone pressure sensitive adhesive composition comprising 45 to 75 parts by weight of a silicone resin and 25 to 55 parts by weight of a silicone polymer gum, the improvement comprising adding to said composition 0.5 to 50 parts by weight, based on a total of 100 parts by weight of the resin and polymer gum, of a cluster compound selected from the group consisting of (A) RSi{OSi(OR')$_3$}$_3$, (B) M<OSi{OSi(OR')$_3$}$_3$>$_a$, (C) M<OSiR{OSi(OR')$_3$}$_2$>$_a$, and

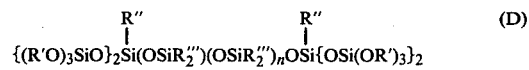

(D)

wherein R is hydrogen, an alkyl, alkenyl, aryl or aralkyl group, R' is hydrogen, an alkyl, alkenyl, aryl or aralkyl group, with the proviso that at least a majority of the R' radicals are sterically hindered alkyl groups having at least 3 carbon atoms, M is a substituted or unsubstituted branched or straight chain hydrocarbon radical, a is 2, 3, or 4, n is an integer from 0 to 300, R" is hydrogen, an alkyl, alkenyl, aryl, aralkyl or —OSi(OR')$_3$ group and R'" is hydrogen, an alkyl, alkenyl, aryl, aralkyl, hydroalkyl, and halo or cyano substituted alkyl, alkenyl, aryl, aralkyl and hydroalkyl. More specifically, the invention preferably provides for enhancing tack properties of pressure sensitive adhesives based on relatively high resin to polymer ratio formulations by adding to such formulations from 0.5 to 50 parts by weight, based on a total of 100 parts by weight of resin and polymer, and preferably in an amount directly proportional to the resin to polymer ratio of the adhesive, of a silicone cluster compound as described above. Also provided according to the invention are formulations providing adhesives with good adhesive strength as well as good tack properties after heat aging by adding to the silicone pressure sensitive adhesive formulations such silicone cluster compounds. Preferred among the cluster compounds useful in practice of the invention are those alkoxysilicone cluster compounds of the above formula wherein R is methyl and each R' is secondary butyl.

DETAILED DESCRIPTION

The silicone cluster compounds suitable for use in practice of the invention include those described in, and prepared by the methods set forth in U.S. Pat. Nos. 3,965,136; 3,992,429; 4,058,546; and 4,077,993 to Knollmeuller. The disclosures of these patents are hereby incorporated herein by reference. Such cluster compounds have the formulae RSi-{OSi(OR')$_3$}$_3$, M<OSi{OSi(OR')$_3$}$_3$>$_a$, M<OSiR{OSi(OR')$_3$}$_2$>$_a$, and

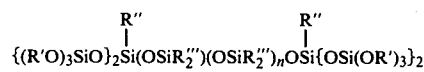

wherein R is hydrogen, an alkyl, alkenyl, aryl or aralkyl group, R' is hydrogen, an alkyl, alkenyl, aryl or aralkyl group, with the proviso that at least a majority of the R' radicals are sterically hindered alkyl groups having at least 3 carbon atoms, M is a substituted or unsubstituted branched or straight chain hydrocarbon radical, a is 2, 3, or 4, n is an integer from 0 to 300, R'' is hydrogen, an alkyl, alkenyl, aryl, aralkyl or —OSi(OR')$_3$ group, and R''' is hydrogen, an alkyl, alkenyl, aryl, aralkyl, hydroalkyl, and halo or cyano substituted alkyl, alkenyl, aryl, aralkyl and hydroalkyl. Preferred cluster compounds for use in the invention are those wherein R is a methyl group and each R' radical is a secondary butyl radical. Such preferred clusted compounds are presently commercially available from Olin Chemicals (Stamford, Connecticut) under the trade designation "Silicate Cluster 102" and "Silicate Cluster 2102".

According to one aspect of the invention, cluster compounds are cold mixed into uncured adhesive formulations containing a ratio of silicone resin to silicone polymer gum of from 45 to 75, preferably 45 to 60, parts by weight and the silicone polymer gum component comprises from 25 to 55, preferably 40 to 55, parts by weight in a formulation based on a total of 100 parts by weight of the resin plus polymer. It has been found that the addition of from about 0.5 to about 50 parts by weight cluster compound, based on 100 parts of the resin plus polymer combination, to adhesives having a relatively high resin to polymer ratio formulation will allow for development of a cured adhesive material possessing high adhesive strength characteristics and high tack characteristics. The preferred quantity of cluster compound to add to such formulations is related to the resin to polymer ratio in the adhesive. Thus, for adhesive formulations having a resin to polymer ratio of from 45/55 to 60/40 the amount of cluster compound to be used typically ranges from about 0.5 to 10, preferably from about 1 to 5, parts by weight, whereas for adhesive formulations having higher resin to polymer ratios the amount of cluster compound to be used typically ranges from about 10 to 50, preferably from about 10 to 35 parts by weight; all weights being referred to 100 parts by weight of resin plus polymer.

According to another aspect of the invention, uncured silicone adhesive formulations having improved tack characteristics after curing and heat aging are prepared wherein 0.5 to 50 parts by weight, based on 100 parts of the resin plus polymer combination, of the cluster compounds as described above are added to the formulation.

The following examples are provided as illustrative of practice of the invention and are not intended to establish limits upon the invention as subsequently claimed. Quantitative tack measurements reported therein are performed through use of a POLYKEN ™ brand Probe Tack Tester (Testing Machines, Inc., Amityville, NY). Briefly summarized, tack measurements, expressed in units of grams of tack, were obtained using a probe velocity of 0.5 cm/sec, a contact pressure of 100 grams/cm$^2$, and contact time of 0.5 seconds. Quantitative adhesion measurements reported therein were obtained through use of a one-half inch wide aluminum, Mylar ® or Teflon ® tape which contained a 1.5 mil layer of cured adhesive. The tape was adhered to a stainless steel panel and stripped at a rate of 12 inches/minute at an angle of 180°, with the results expressed in ounces per inch. The adhesion test corresponds to ASTM D-1000. Quantitative release measurements were obtained as follows. Supercalendared kraft paper was coated to a thickness of 0.03 mils with Dow Corning ® 7044 release coating and the coating was heat cured. Mylar ® tape, coated with adhesive formulation as described above for adhesion measurements, were adhered to the cured release coating and the resulting laminate was heated for 20 hours at 70° C. The heat aged laminate was then cooled and the Mylar ® tape was stripped from the release coating at a rate of 12 inches/minute and at 20 inches/minute at an angle of 180°, with the results expressed in grams per inch.

EXAMPLE 1

A cold mix of the following general formulation was prepared: 27.4 parts by weight of a polydimethylsiloxane gum (prepared by reaction of 100 parts by weight dimethylsiloxane cyclic trimmer with 0.40 parts by weight of a hydroxy-endblocked polydimethylsiloxane fluid having a viscosity of 60–70 centistokes and 0.24 parts by weight of a potassium silanolate catalyst); 29.7 parts by weight of a resinous trimethylsiloxy-endblocked silicate providing about 2 percent silanol groups and having a ratio of trimethylsiloxy groups to SiO$_2$ groups of from about 0.4 to about 1.2 to 1 and incorporated as a 70 percent solids xylene solution; 6.3 parts by weight of a hexamethyldisilazane-treated resinous silicate as previously noted (providing a maximum of about 0.4 percent silanol groups) and incorporated as a 60 percent solids xylene solution; 2.3 parts by weight isopropanol; 34.2 parts by weight xylene; and, 0.14 parts by weight of a reaction product of 115 parts by weight tetramethylguanidine and 144 parts by weight 2-ethylhexanoic acid in 1036 parts by weight xylene. The formulation thus obtained exemplifies an adhesive material having a relatively high resin to polymer ratio.

EXAMPLE 2

Three 157 gram samples of the cold mix formulation of Example 1 were separated for testing. Control, first and second test samples respectively had 0, 1 gram and 5 grams of the silicone cluster compound RSi{OSi(OR')$_3$}$_3$, wherein R is a methyl group and R' is a secondary butyl group, added with mixing prior to mixing with 1 part by weight benzoyl peroxide and coating on aluminum or Teflon ® strips. The coated compositions were cured by heat treatment at 70° C. for fifteen minutes and then 150° C. for five minutes. Adhesion test measurements with aluminum strips for control, first and second test samples provided values of 89, 83, and 80 respectively. Tack measurements for control, first and second test samples were 236, 353 and 533, respectively. Accelerated aging of the aluminum coating samples was carried out by treatment at 250° C. for 24 hours. Adhesion testing results for the control, first and second test samples so aged were 68, 70 and 70, respectively, while tack testing results for the control and second test samples were 140 and 330, respectively. Tack measurements with Teflon ® coated strips for the control, first and second test samples were 333, 520 and 580 respectively. Accelerated aging (250° C. for 24 hours) of the coated Teflon ® strips was effected and tack measurements of 180, 500 and 410, respectively, were obtained.

The above example indicates not only substantial improvements in tack accompanying the addition of the cluster compound, but some evidence of enhancement of heat stability of the cured adhesive composition as well.

EXAMPLE 3

A test was conducted to ascertain the effects on adhesion over long-term aging of adhesive formulations at room temperature. Four 50 gram samples of an adhesive formulation prepared according to Example 1 were separated for testing. To control, first, second and third samples were added respectively 0, 0.3, 1.5, and 3.6 grams of the preferred methyl, secondary butyl cluster compound used in Example 2. After being mixed with one percent benzoyl peroxide, coated on aluminum or Teflon ® and cured with heat treatment of fifteen minutes at 70° C. and five minutes at 150° C., adhesion values were determined for aluminum and Teflon ® strips and the strips then stored at room temperature. Adhesion values were also determined at various intervals thereafter. The results of the tests are set forth in Table 1 below and indicate no substantial adverse effects of the cluster compounds on long term adhesion characteristics.

TABLE 1

Aluminum Strips
Adhesion - ounces/inch

| Aging | Control | First Sample | Second Sample | Third Sample |
|---|---|---|---|---|
| 0 Initial | 88 | 88 | 84 | 64 |
| 3 days | 94 | 90 | 86 | 62 |
| 7 days | 96 | 96 | 92 | 62 |
| 14 days | 100 | 100 | 78 | 66 |
| 1 month | 96 | 100 | 76 | 60 |
| 2 months | 96 | 90 | 70 | 57 |
| 3 months | 100 | 83 | 80 | 59 |
| 6 months | 84 | 100 | 72 | 66 |
| 15 months | 76 | 82 | 72 | 59 |

Teflon ® Strips
Tack - grams

| Aging | Control | First Sample | Second Sample | Third Sample |
|---|---|---|---|---|
| 0 Initial | 460 | 667 | 787 | 770 |
| 3 days | 400 | 740 | 840 | 805 |
| 7 days | 340 | 687 | 823 | 826 |
| 14 days | 420 | 750 | 660 | 810 |
| 1 month | 350 | 740 | 620 | 760 |
| 2 months | 310 | 770 | 760 | 750 |
| 3 months | 380 | 750 | 810 | 790 |
| 6 months | 379 | 580 | 820 | 760 |
| 15 months | 685 | 713 | 697 | 740 |

EXAMPLE 4

To a 164 gram sample of the formulation of Example 1 there was added 3 grams of the silicone cluster compound $M<OSiR\{OSi(OR')_3\}_2>_a$, wherein R is a methyl group, R' is a secondary butyl group, a is 2 and M is —CH$_2$C(CH$_3$)$_2$CH$_2$—, with mixing prior to curing with 1% by weight of benzoyl peroxide for fifteen minutes at 70° C. followed by five minutes at 150° C. In the adhesion test on aluminum a value of 82 was obtained while in the tack test on Teflon ® a value of 680 was obtained.

EXAMPLE 5

To 184.5 parts by weight of the cold mix formulation of Example 1 there was added an additional 3.5 parts by weight of the resinous trimethylsiloxy-endblocked silicate having about 2 percent silanol groups, incorporated as a 70 percent solids xylene solution. The resulting adhesive formulation had a resin to polymer ratio of about 61.5 to 38.5, by weight. Eight portions of this adhesive formulation were separated for testing, mixed with 4.5, 9.0, 13.4, 17.9, 22.4, 26.9, 31.3 and 35.8 weight percent, respectively, of the preferred methyl-secondary butyl cluster compound used in Example 2 and 1.0 weight percent of benzoyl peroxide, all percentages being based on 100 parts by weight of adhesive solids. The resulting eight formulations of this invention were coated onto 2 mil thick Mylar ® film to provide an adhesive film 1 mil thick and the adhesive films were cured for 10 minutes at room temperature and for 5 minutes at 120° C. The adhesive films were tested for adhesion and release as noted above. Results are summarized in Table 2. Note that adhesion and release for the formulations vary inversely with the amount of cluster compound present therein.

TABLE 2

| Ref. No. | Cluster Compound, weight % | Adhesion, ounces/inch | Release, grams/inch |
|---|---|---|---|
| 5-1 | 4.5 | 41 | 750 |
| 5-2 | 9.0 | 38 | 700 |
| 5-3 | 13.4 | 37 | 570 |
| 5-4 | 17.9 | 33 | 500 |
| 5-5 | 22.4 | 31 | 440 |
| 5-6 | 26.9 | 29 | 400 |
| 5-7 | 31.3 | 28 | 380 |
| 5-8 | 35.8 | 24 | 320 |

EXAMPLE 6

Eight portions of the cold mix formulation of Example 1 were separated for testing, mixed with 5, 10, 15, 20, 25, 30, 35 and 40 weight percent, respectively, of the preferred methyl-secondary butyl cluster compound used in Example 2 and 1.0 percent by weight of benzoyl peroxide, all percentages being based on 100 parts by weight of adhesive solids. These formulations were coated on Mylar ® film, cured and tested as noted in Example 5. Results are summarized in Table 3.

TABLE 3

| Ref. No. | Cluster Compound, weight % | Adhesion, ounces/inch | Release, grams/inch |
|---|---|---|---|
| 6-1 | 5 | 36 | 750 |
| 6-2 | 10 | 34 | 680 |
| 6-3 | 15 | 32 | 520 |
| 6-4 | 20 | 29 | 480 |
| 6-5 | 25 | 26 | 450 |
| 6-6 | 30 | 22 | 400 |
| 6-7 | 35 | 21 | 380 |
| 6-8 | 40 | 19 | 370 |

EXAMPLE 7

Four cold mix adhesive formulations having various resin to polymer ratios were prepared by mixing an additional 0, 3.5, 6 and 18 parts by weight of the resinous trimethylsiloxy-endblocked silicate having about 2 percent silanol groups, and incorporated as a 70 percent solids xylene solution. The resulting adhesive formulations had a resin to polymer ratio of about 57 to 43, 61 to 39, 64 to 36 and 73 to 27, respectively. Four portions of each of the resulting formulations were separated for testing, mixed with various weight percentages (see Table 4) of the preferred methyl-secondary butyl cluster compound used in Example 2 and 1.0 weight percent of benzoyl peroxide, all percentages being based on 100 parts by weight of adhesive solids. The resulting 16 formulations were coated onto 2 mil thick Mylar ® film to provide an adhesive film 2 mils thick and the adhesive coatings were cured for 10 minutes at room temperature and for 5 minutes at 120° C. The cured adhesive films were tested for adhesion, release and tack. Tack was evaluated qualitatively with a finger-touch test. Adhesion was measured as noted above. Release was measured as noted above, except that release was measured at 200 inches/minute as well as at 12 inches/minute. Results are summarized in Table 4. Note that as the resin content of the adhesive formulation is increased higher percentages of the cluster compound are required to create good tack for the cured adhesive. Also note that adhesive formulations having a resin to polymer ratio greater than 60 to 40 possess better release at 200 inches/minute than at 12 inches/minute. This improved release at rapid peel rates is useful for removing waste from die-cut labels adhered to peelable release backing.

mulations to which the cluster compound has been added.

Consistent with the above description of addition of the cluster compounds to existing formulations is that aspect of the invention which provides for the addition of the cluster compound to silicone pressure sensitive adhesive formulations which may be subjected to heat aging to enhance their tack characteristics. It is believed that from about 0.5 to about 50 parts by weight, based on 100 parts of the combined weights of the resin and polymer, of the cluster compounds will result in cured adhesives having enhanced tack as well as good adhesion properties.

It will be apparent from the above that practice of the

TABLE 4

| Ref. No. | Resin/Polymer | Cluster Compound, weight % | Adhesion ounces/inch | Release, grams/inch | | Tack(1) |
|---|---|---|---|---|---|---|
| | | | | 12 in/min. | 200 in/min | |
| Control | 57/43 | 0 | 42 | 1020 | none | G |
| 7-1 | " | 3 | 41 | 760 | 1000+ | VG |
| 7-2 | " | 9 | 39 | 700 | 1000+ | VG |
| 7-3 | " | 15 | 35 | 600 | 1000+ | E |
| Control | 61/39 | 0 | 46 | 400-600 | 200-250 | P |
| 7-4 | " | 2.7 | 46 | 400-700 | 125 | P |
| 7-5 | " | 8.1 | 44 | 200-600 | 120 | G |
| 7-6 | " | 13.4 | 42 | 50-550 | 70 | VG |
| Control | 64/36 | 0 | 61 | 50-90 | 50 | N |
| 7-7 | " | 12.5 | 52 | 100-600 | 35 | G |
| 7-8 | " | 25.0 | 45 | 50-600 | 35 | VG |
| 7-9 | " | 33.3 | 39 | 420 | 200 | E |
| Control | 73/27 | 0 | 1 | 0 | 5 | N |
| 7-10 | " | 9.4 | 68 | 0 | 0 | N |
| 7-11 | " | 18.8 | 60 | 0 | 0 | G |
| 7-12 | " | 25.9 | 56 | 0 | 0 | VG |

(1)G = good, VG = very good, E = excellent, P = poor, N = none

EXAMPLE 8

Example 6 was repeated except that the cluster compound used in Example 4 was used instead of the methyl-secondary butyl cluster compound. Adhesion and release results substantially identical to those obtained in Example 6 were obtained.

EXAMPLE 9

Those formulations of Example 7 have reference numbers 7—7, 7-8, 7-10 and 7-11 were repeated except that the cluster compound that was used in Example 4 was used instead of the methyl-secondary butyl cluster compound. The formulations were tested for adhesion, release and tack as described in Example 7. Results are summarized in Table 5.

invention allows for both the development of high tack, highly adhesive silicone pressure sensitive adhesives as well as modification, prior to curing, of existing formulations which would ordinarily be expected to form highly adhesive cured products having low tack characteristics. The latter aspect is of substantial commercial significance because it allows the end user to stock supplies of adhesive formulations generating highly adhesive cured products but to modify such formulations to develop aggressively tacky cured adhesives on a small scale and as desired for a particular end use.

Modifications and variations of the invention as above described are expected to occur to those skilled in the art upon consideration of the foregoing description and consequently only such limitations as appear in the appended claims should be placed on the invention.

TABLE 5

| Ref. No. | Resin/Polymer | Cluster Compound, weight % | Adhesion, ounces/inch | Release, grams/inch | | Tack(1) |
|---|---|---|---|---|---|---|
| | | | | 12 in/min. | 200 in/min. | |
| Control | 64/36 | 0 | 61 | 50-90 | 50 | N |
| 8-1 | " | 12.5 | 50 | 600-800 | 60 | G |
| 8-2 | " | 25.0 | 39 | 380 | 125-175 | G |
| Control | 73/27 | 0 | 1 | 0 | 5 | N |
| 8-3 | " | 9.4 | 65 | 0 | 10 | P |
| 8-4 | " | 18.8 | 56 | 0 | 10 | F |

(1)G = good, F = fair, P = poor, N = none.

It should also be found that additions of the cluster compound do not appear to require any unusual processing steps other than simple mixing and that the usual range of catalyst (e.g., from 0.5 to 4 weight percent benzoyl peroxide based on solids content of the formulation) may be employed satisfactorily to cure the for- That which is claimed is:

1. In a silicone pressure sensitive adhesive composition comprising 45 to 75 parts by weight of a silicone resin and 25 to 55 parts by weight of a silicone polymer gum, the improvement comprising adding to said composition 0.5 to 50 parts by weight, based on a total of 100 parts by weight of the resin and polymer gum, of a cluster compound selected from the group consisting of (A) RSi{OSi(OR')$_3$}$_3$,
(B) M<OSi{OSi(OR')$_3$}$_3$>$_a$,
(C) M<OSiR{OSi(OR')$_3$}$_2$>$_a$, and

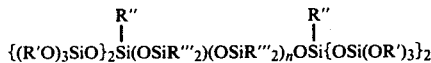

{(R'O)$_3$SiO}$_2$Si(OSiR'''$_2$)(OSiR'''$_2$)$_n$OSi{OSi(OR')$_3$}$_2$ wherein

R is hydrogen, an alkyl, alkenyl, aryl or aralkyl group,

R' is hydrogen, an alkyl, alkenyl, aryl or aralkyl group with the proviso that at least a majority of the R' radicals are sterically hindered alkyl groups having at least 3 carbon atoms, M is a substituted or unsubstituted branched or straight chain hydrocarbon radical, a is 2, 3, or 4, n is an integer from 0 to 300, R" is hydrogen, an alkyl, alkenyl, aryl, aralkyl or —OSi(OR')$_3$ group, and R''' is hydrogen, an alkyl, alkenyl, aryl, aralkyl, hydroalkyl, and halo or cyano substituted alkyl, alkenyl, aryl, aralkyl, and hydroalkyl.

2. A pressure sensitive adhesive as defined in claim 1 wherein the cluster compound has formula (A).

3. A pressure sensitive adhesive as defined in claim 2 wherein the formula (A) R is a methyl group and each R' is a secondary butyl group.

4. A pressure sensitive adhesive as defined in claim 1 wherein the cluster compound has formula (B).

5. A pressure sensitive adhesive as defined in claim 1 wherein the cluster compound has formula (C).

6. A pressure sensitive adhesive as defined in claim 5 wherein in formula (C) R is a methyl group, each R' is a secondary butyl group, a is 2, and M is —CH$_2$C(CH$_3$)CH$_2$— radical.

7. A pressure sensitive adhesive as defined in claim 1 wherein the cluster compound has formula (D).

8. A pressure sensitive adhesive as defined in claims 3 or 6 wherein the ratio of silicone resin to silicone polymer gum has a value of from 45/55 to 60/40 and the amount of cluster compound has a value of from 0.5 to 10 parts by weight.

9. A pressure sensitive adhesive as defined in claims 3 or 6 wherein the ratio of silicone resin to silicone polymer gum has a value of greater than 60/40 and the amount of cluster compound has a value of from 10 to 50 parts by weight.

* * * * *